United States Patent
Saarem et al.

[11] Patent Number: 6,003,550
[45] Date of Patent: Dec. 21, 1999

[54] COMBINATION SHUT OFF VALVE AND EXCESSIVE FLOW VALVE

[76] Inventors: Myrl J. Saarem, 2057 N Washington St., Carson City, Nev. 89703; Kenneth M. Saarem, 8200 Offenhauser Dr. Apt. 135F, Reno, Nev. 89511

[21] Appl. No.: 09/113,404

[22] Filed: Jul. 10, 1998

[51] Int. Cl.⁶ .................................................. F16K 17/00
[52] U.S. Cl. ..................................... 137/614.17; 137/460
[58] Field of Search ........................... 137/614.17, 614.2, 137/460, 613

[56] References Cited

U.S. PATENT DOCUMENTS

| | | | |
|---|---|---|---|
| 3,106,937 | 10/1963 | Sands | 137/613 |
| 3,701,361 | 10/1972 | Bunn et al. | 137/543.23 |
| 3,734,339 | 5/1973 | Young | 222/59 |
| 3,830,297 | 8/1974 | Cockrell | 137/460 |
| 3,971,438 | 7/1976 | Crowe | 137/460 |
| 4,049,016 | 9/1977 | Henry | 137/498 |
| 4,269,215 | 5/1981 | Odar | 137/460 |
| 4,787,416 | 11/1988 | Chuang | 137/460 |
| 4,821,759 | 4/1989 | Diamond | 137/45 |
| 4,958,657 | 9/1990 | Hagan | 137/513.5 |
| 5,076,321 | 12/1991 | Terry | 137/460 |
| 5,215,113 | 6/1993 | Terry | 137/460 |
| 5,236,002 | 8/1993 | Marin et al. | 137/508 |
| 5,462,081 | 10/1995 | Perusek | 137/498 |
| 5,482,077 | 1/1996 | Serafin | 137/543.23 |
| 5,551,479 | 9/1996 | Graves | 137/614.2 |
| 5,577,531 | 11/1996 | Hayden et al. | 137/614.2 |
| 5,613,518 | 3/1997 | Rakieski | 137/513.5 |
| 5,704,385 | 1/1998 | McGill et al. | 137/460 |

*Primary Examiner*—Denise L. Ferensic
*Assistant Examiner*—Joanne Y. Kim

[57] ABSTRACT

A combination valve that provides both positive shut off and excessive flow shut off. A rotary valve is provided. In its first position an integral excessive flow shut off valve allows normal flow and shuts off if high flow occurs. In a second position the flow is shut off independent of the excessive flow valve. A third position is provided for purging a repaired or new system and for resetting the excessive flow shut off valve.

5 Claims, 5 Drawing Sheets

COMBINATION SHUT OFF VALVE AND EXCESSIVE FLOW VALVE

BACKGROUND—FIELD OF THE INVENTION

This invention relates to automatic shut off of the flow of combustible gas from a ruptured conduit or failed fitting and the subsequent resetting of the system after the conduit or fitting is repaired.

BACKGROUND—DESCRIPTION OF PRIOR ART

A typical combustible gas distribution system brings the gas from a street main below ground level, through a tapping tee, a service line, a riser to above ground level, a meter cock, a regulator, a meter and then into the customer structure.

Rupture of the line or failure of fittings between the consumer property line and the served customer structure can occur for any number of reasons. Among these are digging by the consumer or other party, ground settling, failure of a regulator, failure of a meter, failure of fittings and earthquakes.

Dangerous explosive conditions can arise when such a rupture occurs. Inventors have addressed this problem and examples of issued patents are U.S. Pat. Nos. 5,613,518, 5,462,081, and 4,958,657. These patents show various structures for shutting off the gas flow when the flow exceeds a predetermined value. These excessive flow shut off devices are generally installed near the gas main and downstream of the tapping tee.

These structures utilize a spring that biases a poppet opposite to the direction of flow. Under normal conditions the poppet is held away from a valve seat by the bias spring. When the flow is excessive, such as when the service line ruptures, the forces from the flowing fluid overcome the spring bias and the poppet closes against a seat, shutting off the flow. Thus the dangerous flow of combustible gas is stopped.

A problem exists, however, after the ruptured line is repaired. The poppet of the excessive flow device remains on its seat and must be reset in order for normal service to be restored. Several schemes are used to accomplish the reset.

One scheme is to pressurize the repaired line to create enough back pressure on the poppet so that the closing forces on the poppet are reduced to the extent that the bias spring can now move the poppet back to the open position.

Another scheme is to allow a small bleed flow through the poppet so that the repaired line will eventually become pressurized to a value equal to the pressure in the main and then the bias spring will move the poppet to the open position. This method could take an objectionably long time for reset to occur and may still present a dangerous explosive condition during the repair period.

Another problem that is faced when the line is repaired is the purging of unwanted air or non-combustible gas from the repaired line. If the repaired line is vented rapidly to purge the unwanted gas the excessive flow device may be tripped and an undesired shut off of the gas flow would occur.

OBJECTS AND ADVANTAGES

This invention is a combination shut off valve and excessive flow valve and provides for:

(a) manually shutting off the flow at any time under any conditions of flow, (b) automatically shutting off the flow when the flow is excessive, such as, when the flow exceeds a predetermined value, (c) purging of the repaired line in a timely manner, (d) purging of a newly installed line in a timely manner, and (e) resetting the excessive flow valve.

DRAWING FIGURES

In the drawings, closely related Figures have the same number but different alphabetic suffixes.

DESCRIPTION

Figure 1:
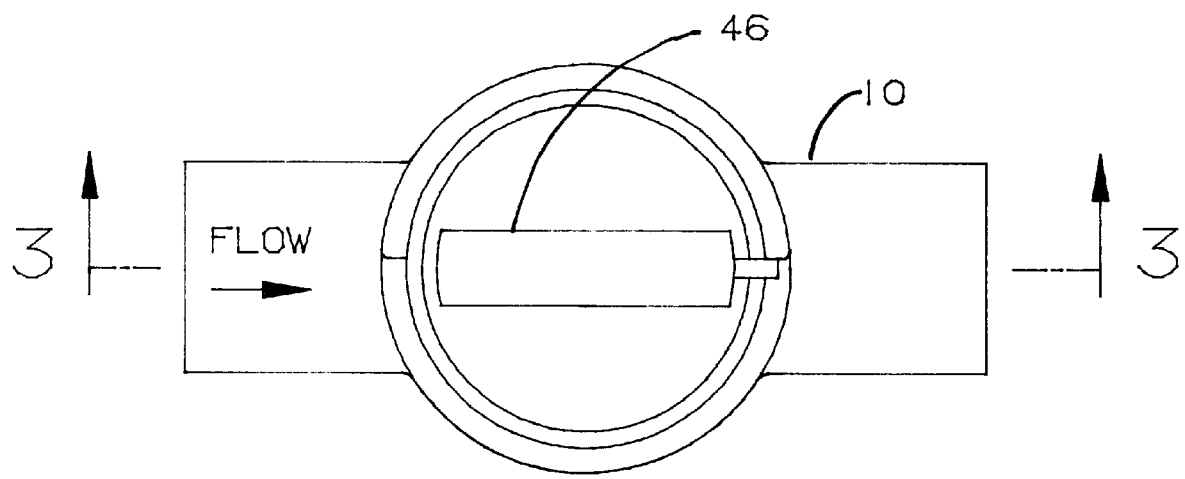
FIG. 1 is a plan view of the invention.
Figure 2:
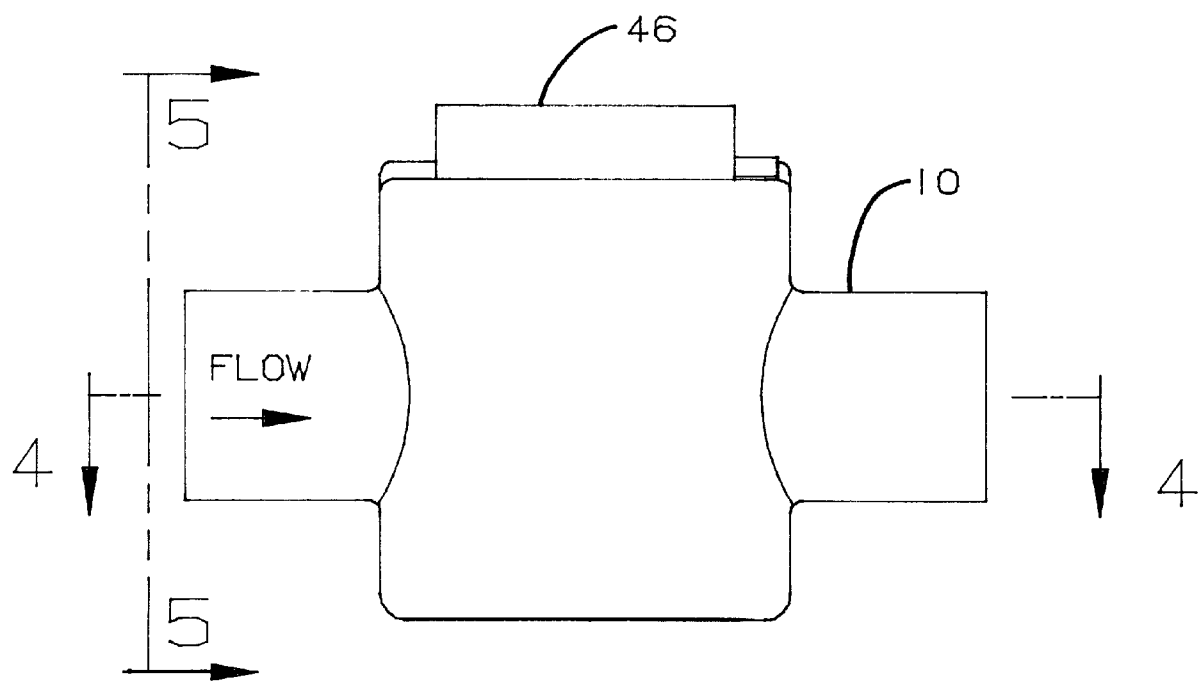
FIG. 2 is a side view of the invention.

The preferred embodiment of the combination shut off valve and excessive flow valve, combination valve 10, is shown in plan view in FIG. 1 and in side view in FIG. 2.

Figure 3:
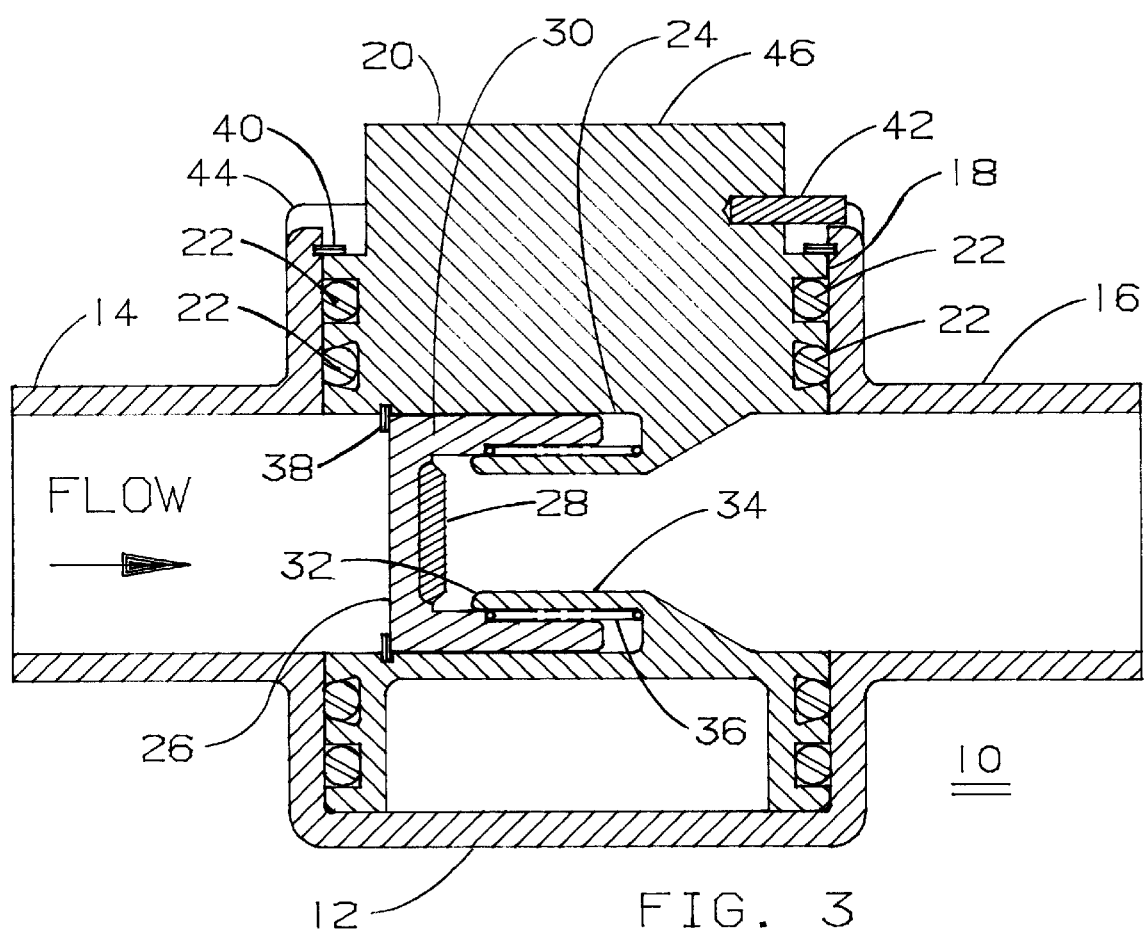
FIG. 3 is a cross sectional view of the invention taken along the line 3—3 in FIG. 1 and shows the excess flow device in position for free flow.

Housing 12, as shown in FIG. 3, has an inlet 14 for receiving fluid from a supply source and an outlet 16 for dispensing fluid to a supply line. Centrally located in housing 12 is a cylindrical opening 18 which envelops a rotatable valve member 20. Rotatable valve member 20 is generally cylindrical in this embodiment, but could be spherical or tapered plug shaped as well.

Seals 22 are provided to prevent leakage between the inlet 14 and the outlet 16 and between inlet 14 or outlet 16 and atmosphere. Other sealing arrangements may be used, such as conventional O-rings or plastic to plastic interference between the rotatable valve member 20 and the housing 12.

Figure 5:
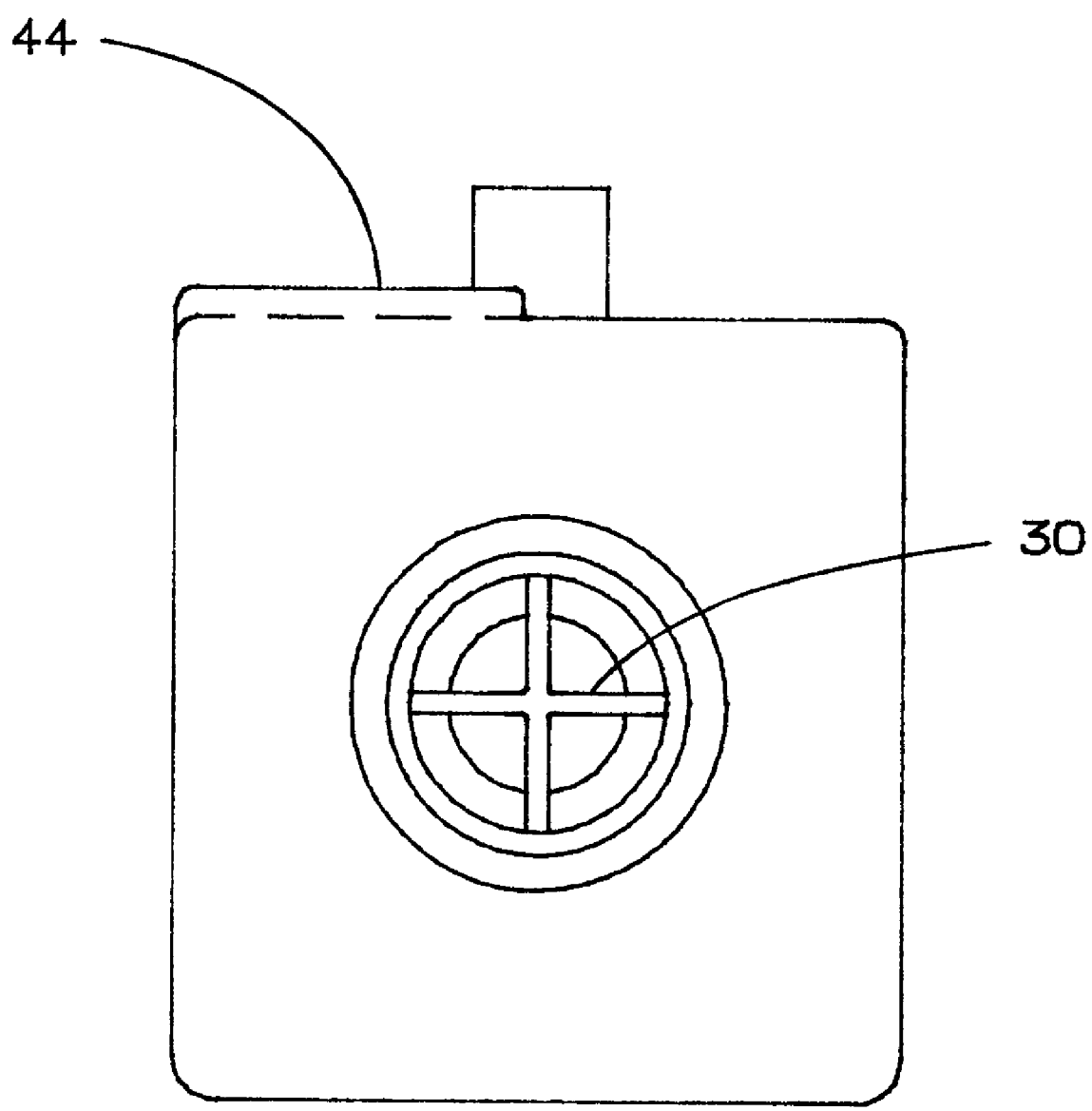
FIG. 5 is an end view of the invention taken along the line 5—5 of FIG. 2 looking into the inlet port and showing the guide fins of the shut off poppet.

Rotatable valve member 20 contains cylindrical openings that are concentric with inlet 14 and outlet 16. Cylindrical opening 24 houses a poppet 26. Poppet 26 has a central valve seal 28 integrally attached to at least three guide fins 30. The guide fins 30 fit slideably in cylindrical opening 24 and align valve seal 28 with valve seat 32. An end view of guide fins 30 is shown in FIG. 5.

Tube 34 is an integral part of rotatable valve member 20 and supports valve seat 32. The outer diameter of tube 34 provides a guide for bias spring 36 which biases poppet 26 away from seat 32. Retaining ring 38 provides a stop that positions poppet 26 with respect to seat 32 under normal flow conditions. Other stops can be provided, such as molded in snap fits in cylindrical opening 24. The guide fins 30 are structured to keep the bias spring 36 out of the flow path throughout the excursion of poppet 26.

Retaining ring 40 secures rotatable valve member 20 in the cylindrical opening in housing 12. Stop pin 42 provides rotational limits in conjunction with raised portion 44 of housing 12.

The upper portion of the rotatable valve member 20 is shaped in the form of a rectangular bar 46 to facilitate rotation using a key while the combination valve 10 is below ground level.

OPERATION

Figure 4A:
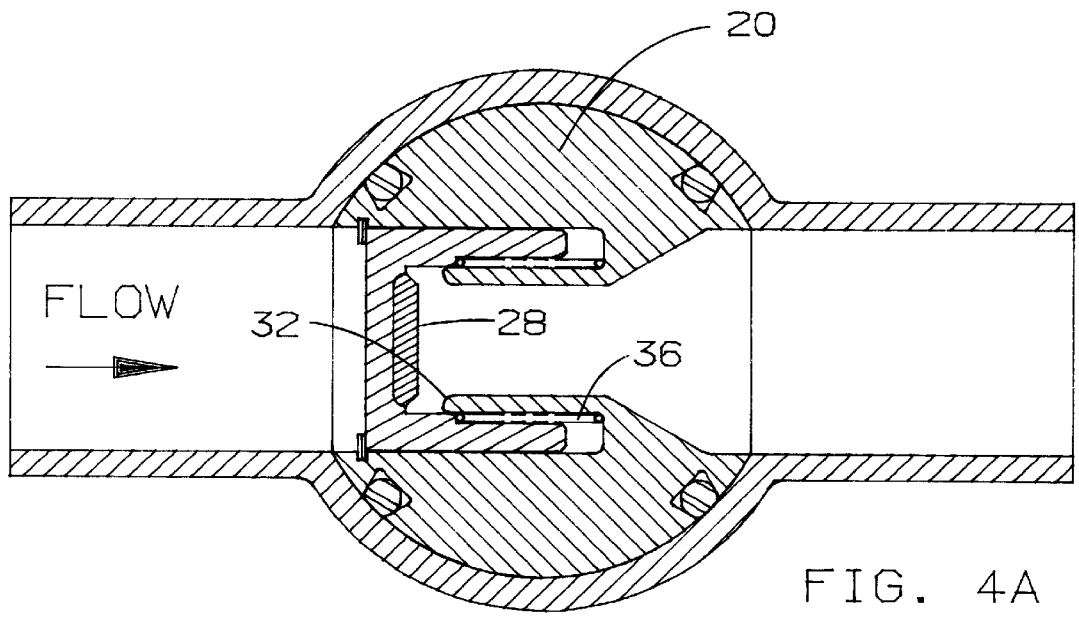
FIG. 4A is a cross sectional view of the invention taken along the line 4—4 in FIG. 2 and shows the excess flow device in position for free flow.

FIG. 4A shows the rotatable valve member 20 in a normal flow position. The flow rate is sufficiently low to allow the bias spring 36 to keep seal 28 off of seat 32.

Figure 4B:
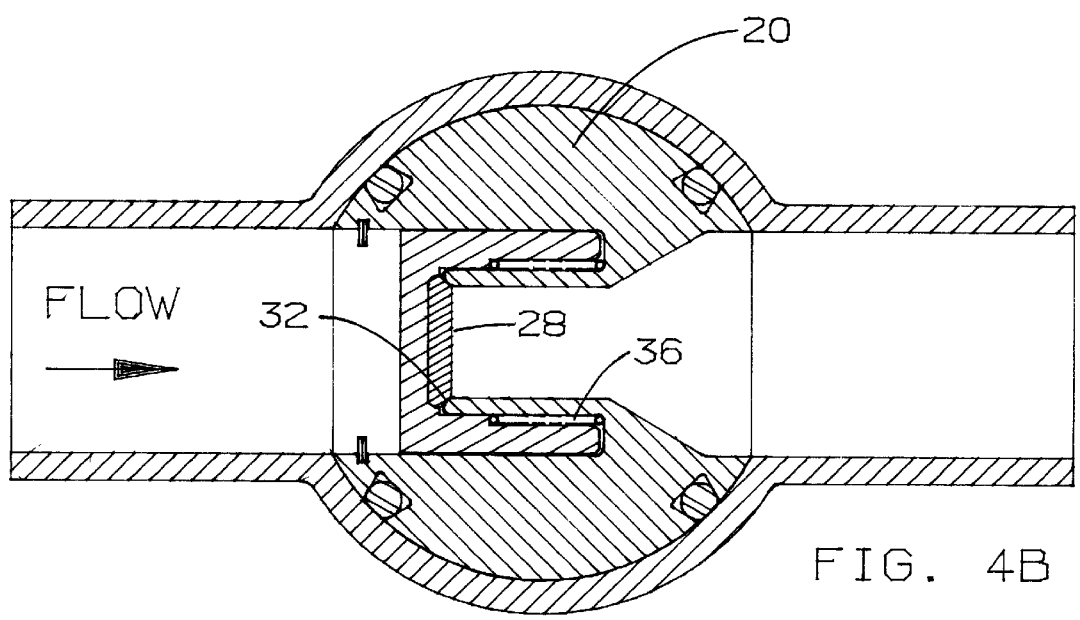
FIG. 4B is a cross sectional view of the invention taken along the line 4—4 in FIG. 2 and shows the excess flow device in a tripped, shut off position.

If a downstream line ruptures, the flow forces overcome the spring 36 bias force and the seal 28 shuts off against the seat 32 as shown in FIG. 4B. The flow is entirely shut off.

Figure 4C:
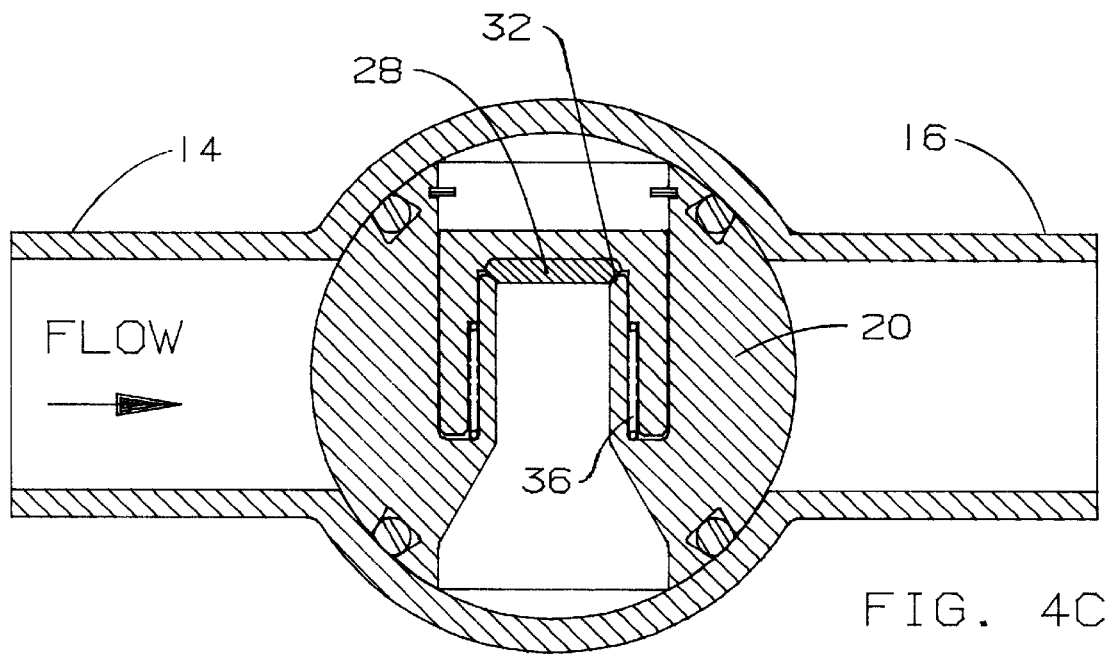
FIG. 4C is a cross sectional view of the invention taken along the line 4—4 in FIG. 2 and shows the rotational valve rotated 90 degrees to the shut off position.

In FIG. 4C the rotatable valve member 20 has been rotated 90 degrees clockwise. Regardless of whether excess flow has occurred or not the flow has been shut off. The inlet 14 and the outlet 16 are sealed from each other and from atmosphere. This would be the position recommended during installation or repair of the service line. The seal 28 may be against seat 32 or it may not.

Figure 4D:
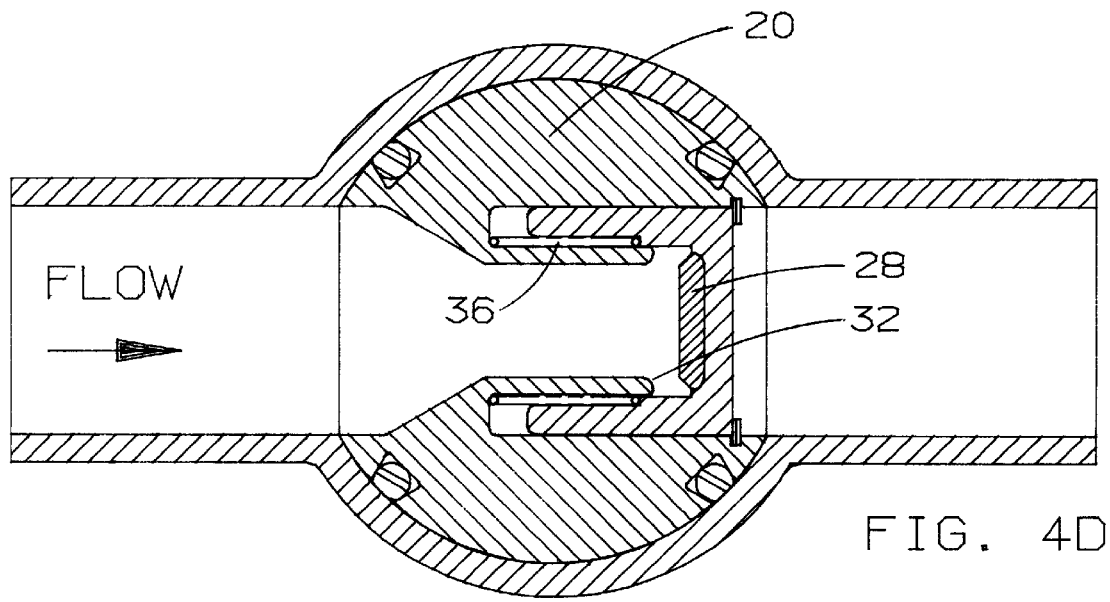
FIG. 4D is a cross sectional view of the invention taken along the line 4—4 in FIG. 2 and shows the rotational valve rotated 180 degrees to the purge and reset position.

After installation of the service or repair of the service line, the rotatable valve member 20 is rotated another 90 degrees clockwise as shown in FIG. 4D. Free flow through the combination valve 10 is now possible regardless of the flow rate. Therefore, the repaired or newly installed service can be purged without tripping the excessive flow valve. In this position the seal 28 is forced away from seat 32 by both the flow forces and the spring 36 bias.

After all repairs or installation and all purging, the rotatable valve member 20 can now be rotated 180 degrees counter clock wise to its original normal flow position as shown in FIG. 4A and the excessive flow valve has been reset and the system is ready to provide service.

What is claimed is:

1. A combination shut off valve and excessive flow valve comprising:

(a) a housing containing a means for receiving fluid and a means for discharging fluid, (b) a rotatable valve means mounted in said housing, (c) an excessive flow shut off means mounted inside and as part of said rotatable valve means.

2. The combination valve of claim 1 wherein said rotatable valve means can be positioned to provide means for fluid to flow from an inlet to an outlet of said combination valve if the flow rate is below a predetermined value and provide said excessive flow shut off means to shut off the flow if the flow is above a predetermined value.

3. The combination valve of claim 1 wherein said rotatable valve means can be positioned to shut off all flow through said valve combination.

4. The combination valve of claim 1 wherein said rotatable valve means can be positioned to provide means for fluid to flow from said inlet to said outlet of said combination valve at any flow rate and to provide means for resetting the excessive flow shut off means.

5. The combination valve of claim 1 wherein said excessive flow shut off means contains a bias spring and a poppet with guide fins structured so that said bias spring is not in the flow path.

* * * * *